(12) United States Patent
Konig et al.

(10) Patent No.: US 9,419,548 B2
(45) Date of Patent: Aug. 16, 2016

(54) METHOD AND CONTROL CIRCUIT FOR CONTROLLING A BRUSHLESS ELECTRIC MOTOR

(71) Applicant: ebm-papst Mulfingen GmbH & Co. KG, Mulfingen (DE)

(72) Inventors: Daniel Konig, Gerabronn (DE); Thomas Brand, Mulfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 61 days.

(21) Appl. No.: 14/220,256

(22) Filed: Mar. 20, 2014

(65) Prior Publication Data

US 2014/0285126 A1 Sep. 25, 2014

(30) Foreign Application Priority Data

Mar. 25, 2013 (EP) .................... 13 160 772

(51) Int. Cl.
| | | |
|---|---|---|
| *H02P 27/00* | (2006.01) | |
| *H02P 6/00* | (2016.01) | |
| *H02P 29/02* | (2016.01) | |

(52) U.S. Cl.
CPC ............ *H02P 6/002* (2013.01); *H02P 29/027* (2013.01); *H02P 2201/11* (2013.01)

(58) Field of Classification Search
CPC ... H02P 6/002; H02P 23/0081; H02P 29/024; H02P 29/027; H02P 29/028; H02P 27/06; H02P 27/04

USPC .................. 318/400.3, 700, 400.06, 400.21, 318/400.22, 400.26, 722

See application file for complete search history.

(56) References Cited

U.S. PATENT DOCUMENTS

| | | | | | |
|---|---|---|---|---|---|
| 4,099,225 | A * | 7/1978 | Nygaard | .................... | 363/56.03 |
| 6,028,406 | A * | 2/2000 | Birk | .......................... | H02P 6/14 |
| | | | | | 318/254.1 |
| 6,815,927 | B2 * | 11/2004 | Ikeda | ...................... | H02P 6/085 |
| | | | | | 318/432 |
| 7,825,620 | B2 * | 11/2010 | Nakatsugawa | .......... | H02P 21/06 |
| | | | | | 318/490 |
| 7,847,499 | B2 * | 12/2010 | Nakamura | .............. | B60L 3/003 |
| | | | | | 318/400.27 |
| 8,143,836 | B2 * | 3/2012 | Iwashita | .................. | H02J 7/345 |
| | | | | | 318/139 |
| 8,816,631 | B2 * | 8/2014 | Wei et al. | ....................... | 318/722 |
| 9,041,335 | B2 * | 5/2015 | Beichter et al. | ............... | 318/504 |
| 2004/0136133 | A1* | 7/2004 | Youm | .......................... | 361/91.1 |

* cited by examiner

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

The invention refers to a method for controlling a brushless, electronically commutated electric motor, a main AC voltage being rectified into an intermediate circuit direct voltage and this direct voltage being fed by an intermediate circuit containing an intermediate circuit capacitor to an inverter which is controlled by a motor control means for feeding and commutating the electric motor whereby the intermediate circuit direct voltage is monitored in respect of its voltage level and is compared with a predetermined limiting value and, on reaching or exceeding the limiting value, the intermediate circuit direct voltage is limited to the predetermined limiting value by clocked disconnection and reconnection.

13 Claims, 3 Drawing Sheets

US 9,419,548 B2

METHOD AND CONTROL CIRCUIT FOR CONTROLLING A BRUSHLESS ELECTRIC MOTOR

CROSS-REFERENCE TO RELATED APPLICATIONS

Figure 1:
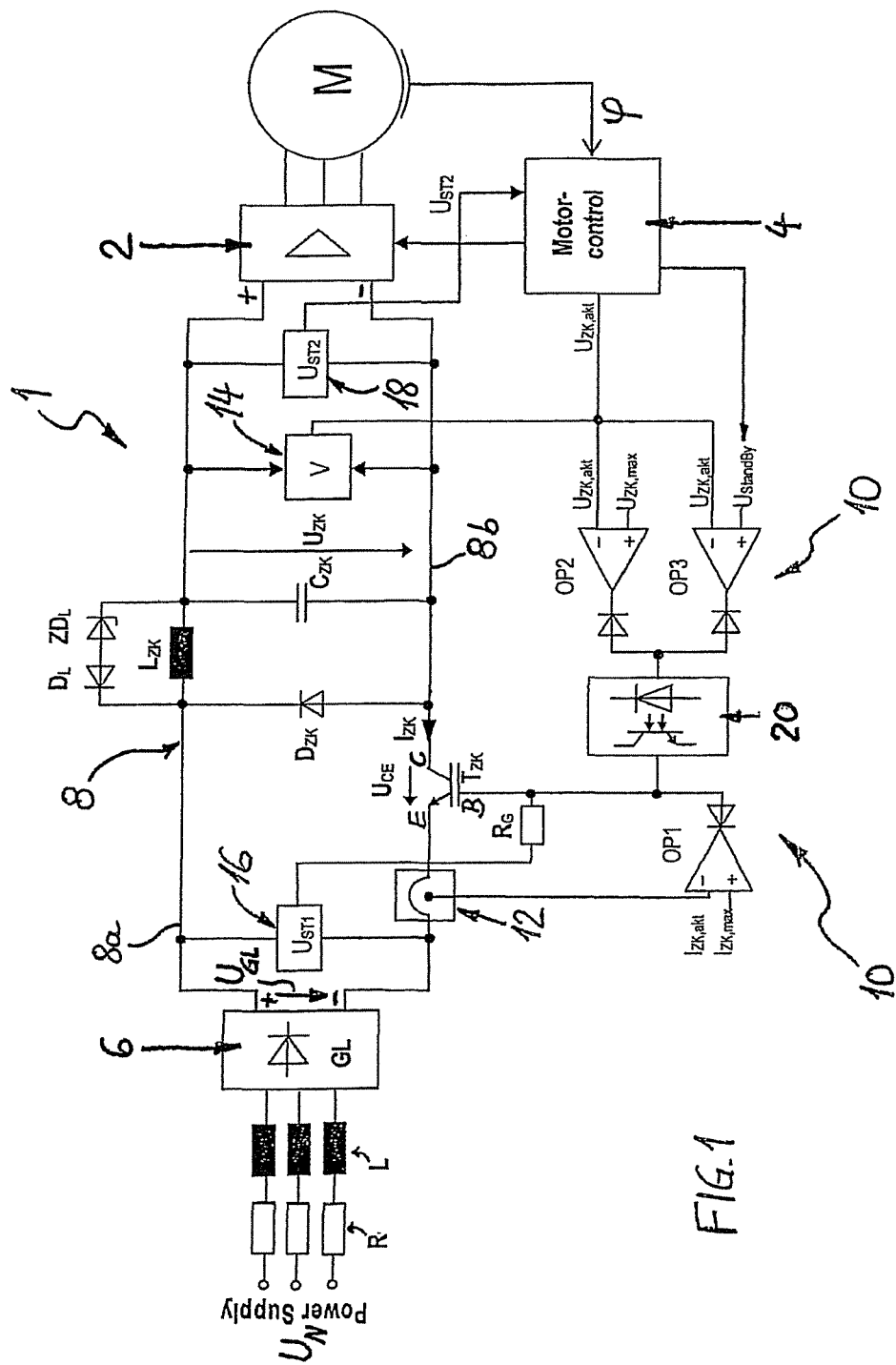

This application claims the benefit and priority of European Patent Application No. 13 160 772.3, filed Mar. 25, 2013. The entire disclosure of the above application is incorporated herein by reference.

FIELD

The present invention relates to a method for controlling a brushless, electronically commutated electric motor, a main AC voltage being rectified into an intermediate circuit direct voltage and this direct voltage being fed to an inverter by an intermediate circuit containing an intermediate circuit capacitor, the inverter being controlled by a motor control means to feed and commutate the electric motor.

The invention also relates to a corresponding control circuit comprising a power rectifier, an intermediate circuit connected downstream with a positive line and a negative line and also comprising an inverter fed with an intermediate circuit direct voltage from the intermediate circuit and controllable by an electronic motor control means for commutating the electric motor, an intermediate circuit capacitor being arranged in the intermediate circuit.

BACKGROUND

This section provides background information related to the present disclosure which is not necessarily prior art.

Electronically commutated electric motors, often also known as EC motors for short, are sufficiently well known; they are employed for numerous uses, for example as drives for fans or ventilators in ventilation and air conditioning technology. EC motors of this type operate according to the described generic method and, for this purpose, have an appropriate control circuit of the generic type described above. Reference is made in this respect to documents EP 2 482 442 A1 and EP 2 267 883 A1 for example which, however, are predominantly concerned with specific measures with regard to the configuration of the intermediate circuit as a "thin intermediate circuit" with minimal intermediate circuit reactance (capacitance, inductance).

In practical use of EC motors of this type, problems can arise due in particular to mains-side overvoltages and overcurrents, if not all components are configured for particularly high voltages and currents which, however, increases the cost.

The present invention is therefore based on the object of ensuring, at the lowest possible expense, a high functional reliability as well as an economical operation of the EC motor and of the control circuit thereof.

SUMMARY

This section provides a general summary of the disclosure, and is not a comprehensive disclosure of its full scope or all of its features.

According to the invention, advantageous configurations are contained in the following description.

Thus, according to the invention, a voltage is limited and preferably also a current is limited in the intermediate circuit using an electronic switch, arranged in the intermediate circuit, more specifically in particular in the negative line thereof, by a clocked control. As a result, economical components having an electrical strength and current-carrying capacity which is configured for normal operation and is therefore relatively low can be used, without the risk of components being damaged or even destroyed by overvoltages and/or overcurrents. As a result of the voltage limitation according to the invention, by presetting a suitable voltage limiting value which is less than/equal to the component electrical strength, an effective overvoltage protection is achieved. Furthermore, a standby operation with reduced power loss is also advantageously and very easily possible in that a reduced voltage for the intermediate circuit is preset as the voltage limiting value, the level of which reduced voltage is calculated such that a basic function of the motor control means is still ensured so that, on the one hand, the motor control means can initiate the standby operation, but later on can transfer again into normal operation with commutation of the motor. Thus, in the preferred configuration, the intermediate circuit switch according to the invention has a three-fold function. Details will be described more precisely in the following.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the following, the invention will be described in more detail on the basis of a preferred embodiment, illustrated in the drawings.

Figure 2:
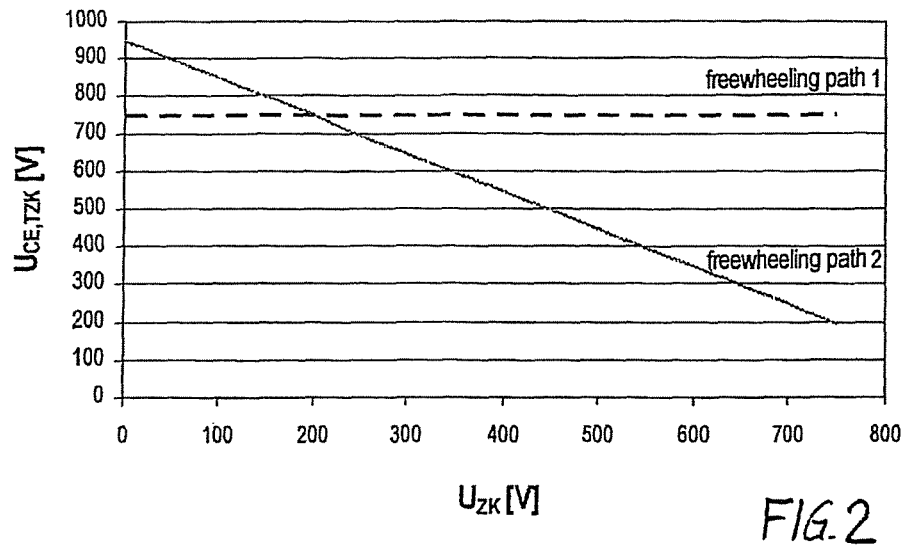
Figure 3:
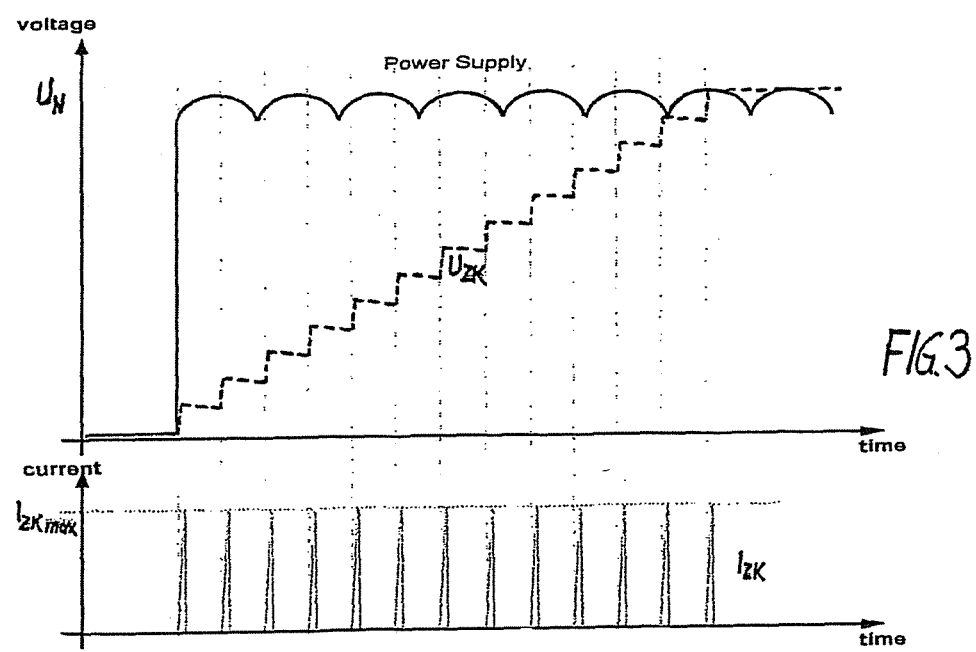
Figure 4:
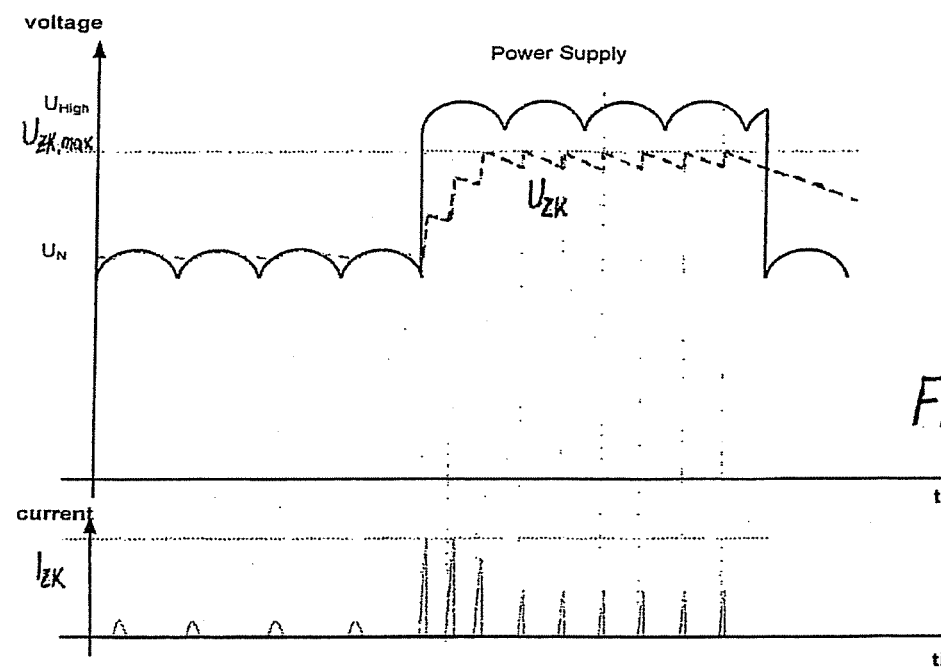
Figure 5:
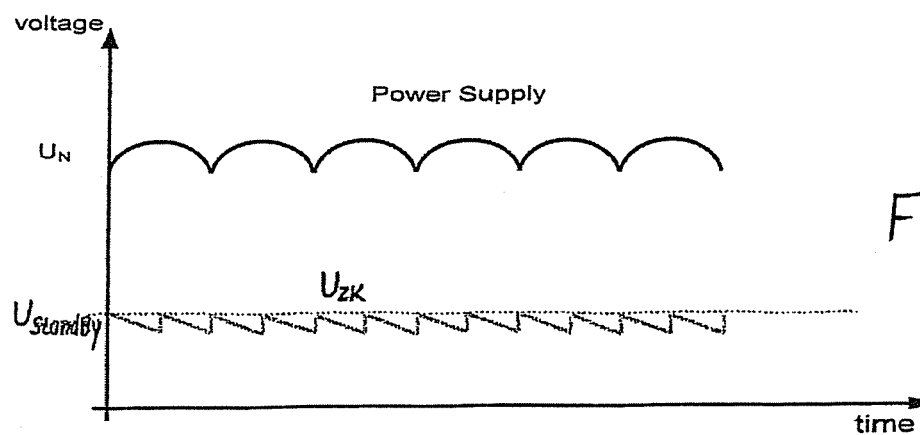

FIG. 1 is a block diagram of a preferred configuration of a control circuit according to the invention, FIG. 2 is a graph illustrating freewheeling procedures, FIG. 3 shows graphs illustrating a current limitation, FIG. 4 shows graphs illustrating an overvoltage limitation of the intermediate circuit direct voltage, and FIG. 5 shows graphs illustrating a voltage limitation to a standby value of the intermediate circuit direct voltage.

Corresponding reference numerals indicate corresponding parts throughout the several views of the drawings.

DETAILED DESCRIPTION

Example embodiments will now be described more fully with reference to the accompanying drawings.

It is explicitly stressed with regard to the following description that the invention is not restricted to the embodiment and is also not restricted to all or to a plurality of features of described feature combinations. In fact, every single partial feature of the embodiment can have an inventive significance on its own and also combined with any other features, even when isolated from all other partial features described in connection therewith.

According to FIG. 1, a control circuit 1 according to the invention is used to control an electric motor M which is illustrated schematically in a greatly simplified form and which is preferably a three-strand, permanent magnet-excited synchronous motor, in short "PMSM", i.e. in fact a three-phase motor which, however, is operated with direct voltage by a controlled inverter 2. For this reason, an electric motor M of this type is often also known as a brushless, electronically commutated DC motor or also as an EC motor for short.

The inverter 2 is constructed in a sufficiently well-known manner as a full bridge end stage from six controlled semiconductor circuit elements (not shown separately) which are controlled by a motor control means 4 (motor control) subject to the rotor rotational position ϕ, detected by suitable means, for commutation and for speed adjustment. This is usually carried out by a pulse width modulation (PWM) so that effectively sinusoidal motor phase voltages and phase currents are modulated.

This type of motor control is sufficiently well known and does not need to be described any further.

To power the motor M, first of all a particularly three-phase mains AC voltage $U_N$ (power supply) is rectified into an intermediate circuit direct voltage $U_{ZK}$ by an uncontrolled power rectifier 6. For the sake of completeness, in the input circuit of the mains AC voltage $U_N$, equivalent resistors R and equivalent inductors L are shown in the three phases. The power rectifier 6 is connected to the inverter 2 by an intermediate circuit 8. The intermediate circuit 8 has a positive line 8a and a negative line 8b. Connected inside the intermediate circuit 8 is an intermediate circuit capacitor $C_{ZK}$, parallel to the power rectifier 6 between the positive line 8a and the negative line 8b, this intermediate circuit capacitor $C_{ZK}$ serving to smooth the rectified, initially pulsating intermediate circuit direct voltage $U_{ZK}$.

In this respect, the intermediate circuit 8 can either be configured as a "thin intermediate circuit" or as a "fat intermediate circuit". A "thin intermediate circuit" contains only a very small intermediate circuit impedance, for which the intermediate circuit capacitor $C_{ZK}$ has a very low capacitance. Thus, in a "thin intermediate circuit", the capacitance is for example only at most 10%, but preferably even only 1% to 7% of the capacitance actually required to smooth the rectified, pulsating intermediate circuit direct voltage $U_{ZK}$ in a "fat intermediate circuit". The magnitude of this capacitance is in principle at least dependent on the consumer power. Depending on configuration, a capacitance in a fat intermediate circuit can be, for example, 330 μF; in this example, a configuration with a thin intermediate circuit would produce an intermediate circuit capacitance of the order of only 5 to 20 μF. For a fat intermediate circuit, the capacitor $C_{ZK}$ is usually formed by an electrolytic capacitor, whereas for a slim intermediate circuit, a simpler, more economical and also more durable foil capacitor suffices.

According to the invention, an electronic switch $T_{ZK}$ with its clearance between open contacts (collector-emitter path C-E) is arranged in a line of the intermediate circuit 8, more specifically particularly in the negative line 8b. The switch $T_{ZK}$ is preferably formed by a transistor which is controlled via its control connection (base B) by a comparator wiring 10 subject to the level of the intermediate circuit direct voltage $U_{ZK}$ and/or to the level of an intermediate circuit current $I_{ZK}$ flowing in the intermediate circuit 8. During operation, the switch $T_{ZK}$ has to carry the entire intermediate circuit current $I_{ZK}$, i.e. the operating current of the commutating electronics (inverter 2 and motor control means 4) as well as the motor operating current.

A freewheeling diode $D_{ZK}$ is also connected inside the intermediate circuit 8 in the reverse direction between positive line 8a and negative line 8b, parallel to the intermediate circuit capacitor $C_{ZK}$. Located in the positive line 8a between the connection points to the intermediate circuit capacitor $C_{ZK}$ and the diode $D_{ZK}$ is an inductor (choke) $L_{ZK}$, with which a further freewheeling arm with a diode $D_L$ and a Zener diode $ZD_L$ is connected in parallel.

To measure the intermediate circuit current $I_{ZK}$, a current sensor 12 is provided, also preferably in the negative line 8b, which sensor 12 can be configured as a measuring shunt, for example. To measure the respectively prevailing intermediate circuit voltage $U_{ZK}$, a suitable voltmeter 14 is connected in the intermediate circuit 8 between the positive line 8a and the negative line 8b.

The comparator wiring 10 according to the invention has a first comparator OP1, a second comparator OP2 and a third comparator OP3. These comparators are preferably formed by operational amplifiers, as shown. The first comparator OP1 forms a current comparator, the second comparator OP2 forms a first voltage comparator and the third comparator OP3 forms a second voltage comparator.

To limit the current, the current comparator OP1 preferably compares the respectively prevailing actual value $I_{ZK,akt}$, detected by the current sensor 12, of the intermediate circuit current $I_{ZK}$ with a predetermined maximum limiting value $I_{ZK,max}$.

According to the invention, to protect against overvoltage, the first voltage comparator OP2 compares the respectively prevailing actual value $I_{ZK,akt}$, detected by the voltmeter 14, of the intermediate circuit direct voltage $U_{ZK}$ with a predetermined maximum limiting value $U_{ZK,max}$.

Finally, in a preferred configuration of the invention, for a standby operation to reduce the power loss, the second voltage comparator OP3 compares the respectively prevailing actual value $U_{ZK,akt}$, detected by the voltmeter 14, of the intermediate circuit direct voltage $U_{ZK}$ with a predetermined reduced voltage value $U_{standby}$.

Furthermore, connected within the intermediate circuit 8 between the positive line 8a and the negative line 8b is a first power supply 16 which provides a first control voltage $U_{ST1}$ from the intermediate circuit direct voltage $U_{ZK}$ to power the intermediate circuit switch $T_{ZK}$ and the first comparator OP1. Also connected in the intermediate circuit 8 between positive line 8a and negative line 8b is a second power supply 18, which is advantageously realised by a switch-mode power supply and which, from the intermediate circuit direct voltage $U_{ZK}$, provides a second control voltage $U_{ST2}$ for the motor control means 4 and for the two voltage comparators OP2 and OP3.

Since there are different earth potentials between the control voltages $U_{ST1}$ and $U_{ST2}$ when the intermediate circuit switch $T_{ZK}$ is open, in the illustrated embodiment the outputs of the two comparators OP2 and OP3 are connected to the control connection B of the switch $T_{ZK}$ by a galvanic isolation, as illustrated for example by an optocoupler 20, while the first comparator OP1 directly controls switch $T_{ZK}$.

Due to the configuration of the control circuit 1 according to the invention described hitherto, the intermediate circuit switch $T_{ZK}$ advantageously has a multiple function. According to the invention, it is primarily used to limit the voltage in the intermediate circuit 8, more specifically subject to the upper limiting value $U_{ZK,max}$ for overvoltage protection (first function) and preferably subject to the reduced limiting value $U_{standby}$ for a standby operation of the control circuit 1 (second function). Furthermore, the intermediate circuit switch $T_{ZK}$ is advantageously also used to limit the current within the intermediate circuit 8 (third function). These functions will be described separately in more detail below.

A) Current Limitation

In conventional control circuits, it is possible, without other current-limiting measures, such as a series resistance, for a very high peak current $I_{ZK}$ to flow in the intermediate circuit 8 through the intermediate circuit capacitor $C_{ZK}$ at the connection moment of the power supply $U_N$, because the capacitor $C_{ZK}$ is not yet charged and therefore practically constitutes a short circuit. This runs the risk that particularly in the contacting region between electrodes and foils in the capacitor, very high temperatures can develop here and there, caused by the high peak currents, so that thermal damage may occur due to the contacts burning down. Furthermore, the so-called current carrying capacity of a capacitor is restricted by the thickness of the electrodes, so that in turn heat losses occur, subject to the strength of the current. In general, capacitors are very sensitive to temperature, which accordingly is reflected negatively in their service life. Furthermore, the necessary power rectifier 6 like the capacitor also has a limited current carrying capacity. If the rectifier 6 is subjected to an excessive current load, it can be damaged or even destroyed, but at least the aging process will be accelerated due to the resulting heat losses. The result of all this can be the failure of the entire commutating electronics.

These problems are advantageously avoided with the preferred current limitation of the control circuit 1 according to the invention.

In addition, high currents also during the operation of the commutating electronics can present a further problem. High currents of this type can be caused at any time by high mains-side voltage transients and overvoltages. High currents of this type can also be advantageously limited with the circuit topology according to the invention, since the topology also remains active during normal operation. In this respect, the above-mentioned limiting value $I_{ZK,max}$ is ideally selected such that a motor current occurring during normal operation does not actively engage the current limitation, but only an inadmissible overcurrent which is above the predetermined limiting value.

The current limitation operates as follows.

If the actual current value $I_{ZK,akt}$ of the intermediate circuit current $I_{ZK}$ reaches or exceeds the predetermined limiting value $I_{ZK,max}$, for example when the intermediate circuit capacitor $C_{ZK}$ is being charged, the output of the current comparator OP1 switches over so that the intermediate circuit switch $T_{ZK}$ disconnects or disables. In this disabling phase of the switch $T_{ZK}$, the energy which was previously stored in the intermediate circuit inductor $L_{ZK}$ is discharged via the freewheeling diode $D_{ZK}$ (freewheeling path 1) or via $D_L$ and $ZD_L$ (freewheeling path 2) into the intermediate circuit 8. When the energy of $L_{ZK}$ has finished discharging, the flow of current also finishes. The freewheeling paths 1 and 2 are required, because due to the rapid disconnection of the intermediate circuit 8, the energy still present in the inductor $L_{ZK}$ tries in the first moment to continue to flow and consequently voltage peaks and overshoots can arise which may be greater than the maximally permissible collector-emitter voltage (for example 1200 V) of the intermediate circuit switch $T_{ZK}$. These could result in destruction of the switch $T_{ZK}$. Since the voltages may possibly be too great in the case of freewheeling via the freewheeling path 2 for the components thereof during a discharging of the intermediate circuit, the additional freewheeling path 1 is required. Thus, depending on the level of the intermediate circuit voltage $U_{ZK}$, the energy is dissipated via freewheeling path 1 and/or freewheeling path 2:

for freewheeling path 1, while disregarding the diode flow voltage of DZK, the following equation is produced for the collector-emitter voltage at the switch TZK:
UCE=UN in freewheeling path 2, DL and ZDL are in series relative to one another, parallel to the inductor LZK. In this respect, ZDL can be configured, for example, as a diode or varistor. In the case of freewheeling via this arrangement, the following equation is produced for the collector-emitter voltage at the switch $T_{ZK}$: $U_{CE}=U_N-U_{ZK}+U_{ZDL}$ At the connection moment when $U_{ZK}=0$ V, the freewheeling path 1 thus initially acts via the diode $D_{ZK}$ up to a specific intermediate circuit voltage, subject to the breakthrough voltage of $ZD_L$, then the energy dissipates in freewheeling path 2 via the arrangement $D_L$ and $ZD_L$. This effect is illustrated in FIG. 2.

After the energy has been discharged from the intermediate circuit inductor $L_{ZK}$, the current comparator OP1 then reconnects the switch $T_{ZK}$, as a result of which the intermediate circuit current $I_{ZK}$ increases with a rate of rise dependent on the inductor $L_{ZK}$, and the charging procedure thereby recommences. These switching cycles are repeated until either the intermediate circuit capacitor $C_{ZK}$ has been charged to the peak voltage of the mains supply voltage $U_N$ or until one of two voltage limits, monitored by the two voltage comparators OP2 and OP3, has been reached, which is described further below. The intermediate circuit switch $T_{ZK}$ according to the invention thereby works in the event of engagement not in linear operation, but always in fixed-cycle operation. This clocked charging procedure of the intermediate circuit 8 is illustrated in FIG. 3. Here it can be seen that due to individual current pulses $I_{ZK}$, the intermediate circuit direct voltage $U_{ZK}$ increases in steps up to the peak value of the mains voltage $U_N$. In this respect, the current in each current pulse is limited to the maximally permissible limiting value of $I_{ZK,max}$, so that overcurrents and negative consequences ensuing therefrom can advantageously be effectively avoided.

B) Voltage Limitation

According to the invention, the voltage $U_{ZK}$ in the intermediate circuit 8 is limited by the comparator wiring 10, two different limiting values being advantageously preset, more specifically, on the one hand, for overvoltage protection and, on the other, preferably temporarily for a standby operation of the control circuit 1.

B1) Overvoltage Protection

The intermediate circuit switch $T_{ZK}$ according to the invention offers as its main function the possibility of protecting the components contained in the control circuit 1, i.e. in the intermediate circuit 8 and also in the inverter 2 and in the motor control means 4, against overvoltages which can occur as a result of unstable mains power supplies, for example. For this purpose, the intermediate circuit switch $T_{ZK}$ limits the intermediate circuit direct voltage $U_{ZK}$.

When the switch $T_{ZK}$ is open, the applied supply voltage $U_N$ is divided into the collector-emitter voltage $U_{CE}$ thereof and into the intermediate circuit voltage $U_{ZK}$. The electrical strength of the electronics is thereby increased to the sum of the maximally possible intermediate circuit voltage and the maximum collector-emitter voltage of the switch:

$$U_{N,PEAK}=U_{ZK}+U_{CE}$$

To keep the component expense within a reasonable range, semiconductor components are used, the electrical strength of which, for example, in a 400 V three-phase mains is up to 1200 V. For this reason, the maximally permissible intermediate circuit direct voltage $U_{ZK}$ should be under this limiting value of, for example, 1200 V to prevent the destruction of components. This maximally permissible voltage is preset in the first voltage comparator OP2 as maximum value $U_{ZK,max}$. The prevailing intermediate circuit direct voltage $U_{ZK}$, determined by the voltmeter 14 is supplied to comparator OP2 as actual value $U_{ZK,akt}$. Comparator OP2 then constantly compares the prevailing intermediate circuit voltage $U_{ZK,akt}$ with the preset maximum limiting value $U_{ZK,max}$. If the prevailing value reaches or exceeds the limiting value, comparator OP2 disconnects the switch $T_{ZK}$. Thereupon, the intermediate circuit capacitor $C_{ZK}$ is discharged by the measuring voltage divider located in the intermediate circuit 8 and by the second power supply 18 ($U_{ST2}$) by a predetermined threshold value until comparator OP2 switches over again and reconnects switch $T_{ZK}$. The intermediate circuit 8 is then once again recharged to the disconnection threshold, while overvoltage is still present. This sequence is repeated until the overvoltage falls to a value below the disconnection threshold. These procedures are illustrated in FIG. 4. With a sustained mains overvoltage, the intermediate circuit direct voltage $U_{ZK}$ is thereby held at a constant level by clocking, thereby ensuring a permanent overvoltage protection.

Furthermore, it can be seen from FIG. 4 that the charging current $I_{ZK}$ caused by the steep rise in voltage at the reconnection moment is also limited to the maximally permissible current $I_{ZK,max}$. Reference is made to the above description, section A), in this respect. The intermediate circuit capacitor $C_{ZK}$ is also charged in stages thereby.

It is also mentioned that no commutation of the motor M should take place during an overvoltage phase so that the intermediate circuit capacitor $C_{ZK}$ is not excessively discharged and consequently the electrical strength of the entire commutating electronics is reduced. Thus, in the event of an overvoltage, the motor control means 4 suspends the commutation until the voltage falls again.

B2) Standby Operation

Analogously to the previously described mode of operation of the overvoltage disconnection, a standby operation can also be advantageously carried out by merely presetting a lower voltage limiting value. Thus, the principle of standby operation is also based on the clocking of the intermediate circuit voltage $U_{ZK}$, but on a lower voltage value below the nominal, rectified mains input voltage $U_N$. The power consumption of the commutating electronics can advantageously be reduced as a result. In this respect, the voltage value of the intermediate circuit direct voltage $U_{ZK}$ in standby operation is expediently selected such that the generation of low voltage for the motor control means 4 still operates appropriately via the second power supply 18.

The standby operation is illustrated in FIG. 5. Plotted on the graph is a reduced intermediate circuit voltage $U_{standby}$, where $U_N$ represents the rectified mains input voltage and $U_{ZK}$ represents the clocked intermediate circuit voltage.

The standby operation is activated by the motor control means 4 as soon as there is no commutation of the motor M. In this case, an appropriate reduced limiting value $U_{standby}$ is preset in the second voltage comparator OP3. The comparator OP3 is also provided with the actual value $U_{ZK,akt}$ of the intermediate circuit voltage, determined by the voltmeter 14, via a second input. When the actual value reaches or exceeds the predetermined limiting value, comparator OP3 disconnects the switch $T_{ZK}$ and then, analogously to the voltage limitation described above, reconnects the switch with a small hysteresis after a short discharging phase of the intermediate circuit capacitor $C_{ZK}$. Thus, according to FIG. 5, the intermediate circuit voltage is also limited here as well by a clocking of the switch $T_{ZK}$.

Finally, it is also mentioned that the intermediate circuit switch $T_{ZK}$ can advantageously be configured as an IGBT or as a MosFET.

The above description makes it clear that the intermediate circuit switch $T_{ZK}$ advantageously has a multiple function. Thus, it can limit the input current into the intermediate circuit capacitor $C_{ZK}$ in that, on exceeding a maximum preset limiting value, the switch is disconnected and is reconnected after the current has diminished. The capacitor $C_{ZK}$ is thereby charged in stages with a limiting of the current. A further function according to the invention of the switch $T_{ZK}$ is voltage limitation, on the one hand for disconnection in the case of high mains-side voltage transients as well as overvoltages to protect all semiconductor components, and on the other hand for a standby operation which advantageously results in a reduction in the loss of power in the intermediate circuit 8 due to the reduced intermediate circuit voltage $U_{ZK}$.

Important advantages are achieved by the invention:

Avoidance of damage and accelerated ageing of semiconductor components as a result of a mains-side overcurrent Avoidance of thermal overloads and of an accelerated ageing of the intermediate circuit capacitor as a result of an excessive charging current Avoidance of destruction of power semiconductors as a result of overvoltage Protection of the entire motor control circuit 1 and also of the motor M in the case of poor or high-impedance mains Limitation of the starting current Avoidance of excessive operating currents Increase in the input electrical strength of the entire circuit Reduction in the standby losses in the intermediate circuit The invention is not restricted to the embodiments which have been illustrated and described, but also includes all configurations which have the same effect within the meaning of the invention. It is explicitly stressed that the embodiments are not restricted to all features in combination, instead each individual partial feature can have an inventive meaning per se, even isolated from all other partial features. Furthermore, the invention is hitherto also not restricted to the combination of features defined in the respective independent claim, but can also be defined by any other combination of specific features of all individual features disclosed in their entirety. This means that in principle, practically any single feature of the respective independent claim can be omitted or replaced by at least one single feature which is disclosed elsewhere in the application. In this respect, the claims are merely to be understood as a first formulation attempt for an invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a brushless, electronically commutated electric motor, the method comprising:
    rectifying a main AC voltage into an intermediate circuit direct voltage;
    feeding the direct voltage by an intermediate circuit containing an intermediate circuit capacitor to an inverter which is controlled by a motor control unit feeding and commutating the electric motor; and
    operating an intermediate circuit switch in the intermediate circuit in a fixed-cycle operation in which the intermediate circuit switch is intermittently disconnected and connected to increase the intermediate circuit direct voltage by multiple steps from an initial voltage up to a predetermined limiting value; wherein the intermediate circuit direct voltage is monitored in respect of its voltage level and is compared with the predetermined limiting value, and on reaching the predetermined limiting value, the intermediate circuit direct voltage is limited to the predetermined limiting value by clocked disconnection and reconnection of the intermediate circuit switch.

2. The method according to claim 1, wherein to limit an overvoltage by presetting a maximally permissible voltage as limiting value, the intermediate circuit direct voltage is limited to a value which is less than/equal to a component-specific electrical strength of components subjected to the intermediate circuit direct voltage.

3. The method according to claim 1, wherein for a standby operation with reduced power loss, by presetting a reduced limiting value, the intermediate circuit direct voltage is limited to a value which still ensures a minimum supply to a motor control means.

4. The method according to claim 1, wherein to limit current within the intermediate circuit, an intermediate circuit current flowing in the intermediate circuit is monitored and compared with a predetermined limiting value and, on reaching or exceeding the limiting value, the intermediate circuit current is limited to the limiting value by a clocked disconnection and reconnection.

5. A control circuit for a brushless, electronically commutated electric motor, the control circuit comprising:

a power rectifier;

an intermediate circuit connected downstream having a positive line and a negative line;

an inverter fed from the intermediate circuit with an intermediate circuit direct voltage and controllable by an electronic control unit commutating the electric motor;

an intermediate circuit capacitor being arranged in the intermediate circuit;

an electronic switch with its clearance between open contacts being arranged in one of the lines of the intermediate circuit, the switch being controllable by a comparator wiring subject to the intermediate circuit direct voltage, detected in each case as the prevailing actual value and by a predetermined limiting value such that on reaching or exceeding the limiting value, the intermediate circuit direct voltage is limited to the predetermined limiting value by a clocked connection of the switch; wherein the electronic switch is controlled intermittently in switching cycles such that the intermediate circuit direct voltage is increased in multiple steps from an initial voltage up to the predetermined limiting value.

6. The control circuit according to claim 5, wherein the electronic switch is controllable by the comparator wiring also subject to an intermediate circuit current, flowing in the intermediate circuit and detected in each case as the prevailing actual value and by a predetermined, maximally permissible current limiting value such that on reaching or exceeding the limiting value, the intermediate circuit current is limited to the predetermined limiting value by a clocked connection of the switch, the intermediate circuit capacitor being charged in stages by current pulses.

7. The control circuit according to claim 5, wherein the comparator wiring has a first voltage comparator to limit overvoltage, an intermediate circuit direct voltage which is maximally permissible considering component electrical strengths being preset as the limiting value.

8. The control circuit according to claim 7, wherein the comparator wiring has a second voltage comparator, in which is preset a reduced intermediate circuit voltage which is still sufficient for a minimum supply to the motor control means, as the limiting value for a standby operation.

9. The control circuit according to claim 8, wherein the first and second voltage comparators are connected on the output side to a control connection of the electronic switch by a galvanic isolation, in particular by an optocoupler.

10. The control circuit according to claim 5, wherein the comparator wiring has a current comparator which is connected on the output side to a control connection of the electronic switch.

11. The control circuit according to claim 5, wherein the electronic switch is arranged in the negative line of the intermediate circuit.

12. The control circuit according to claim 5, wherein the comparator wiring has a voltage comparator, in which is preset a reduced intermediate circuit voltage which is still sufficient for a minimum supply to the motor control means, as the limiting value for a standby operation.

13. A control circuit for a brushless, electronically commutated electric motor, the control circuit comprising:

a power rectifier;

an intermediate circuit connected downstream having a positive line and a negative line;

an inverter fed from the intermediate circuit with an intermediate circuit direct voltage and controllable by an electronic control unit commutating the electric motor;

an intermediate circuit capacitor being arranged in the intermediate circuit;

an electronic switch with its clearance between open contacts being arranged in one of the lines of the intermediate circuit, the switch being controllable by a comparator wiring subject to the intermediate circuit direct voltage, detected in each case as the prevailing actual value and by a predetermined limiting value such that on reaching or exceeding the limiting value, the intermediate circuit direct voltage is limited to the predetermined limiting value by a clocked connection of the switch; wherein the comparator wiring has a first voltage comparator to limit overvoltage, an intermediate circuit direct voltage which is maximally permissible considering component electrical strengths being preset as the limiting value;

the comparator wiring has a second voltage comparator, in which is preset a reduced intermediate circuit voltage which is still sufficient for a minimum supply to the motor control means, as the limiting value for a standby operation; and the first and second voltage comparators are connected on the output side to a control connection of the electronic switch by a galvanic isolation, in particular by an optocoupler.

* * * * *